United States Patent
Gallet et al.

(10) Patent No.: US 9,545,994 B2
(45) Date of Patent: Jan. 17, 2017

(54) DEVICE FOR FEEDING FLUID TO A HYDRAULIC ACTUATOR FOR CONTROLLING THE PITCH OF THE FAN BLADES OF A TWO-PROPELLER TURBOPROP

(75) Inventors: Francois Gallet, Paris (FR); Ivan Guy Rouesne, Saint Maurice (FR)

(73) Assignee: SNECMA, Paris (FR)

( * ) Notice: Subject to any disclaimer, the term of this patent is extended or adjusted under 35 U.S.C. 154(b) by 556 days.

(21) Appl. No.: 14/233,540

(22) PCT Filed: Jul. 10, 2012

(86) PCT No.: PCT/FR2012/051624
§ 371 (c)(1),
(2), (4) Date: Jan. 17, 2014

(87) PCT Pub. No.: WO2013/011225
PCT Pub. Date: Jan. 24, 2013

(65) Prior Publication Data
US 2014/0186182 A1    Jul. 3, 2014

(30) Foreign Application Priority Data

Jul. 21, 2011  (FR) ..................................... 11 56625

(51) Int. Cl.
*B63H 3/08*     (2006.01)
*B64C 11/38*    (2006.01)
(Continued)

(52) U.S. Cl.
CPC .............. *B64C 11/38* (2013.01); *B64C 11/306* (2013.01); *B64D 2027/005* (2013.01); *F16L 27/093* (2013.01); *Y02T 50/66* (2013.01)

(58) Field of Classification Search
CPC .. B64C 11/38; B64C 11/206; B64D 2027/005; F16L 27/093; Y02T 50/66
(Continued)

(56) References Cited

U.S. PATENT DOCUMENTS 2,850,103 A     9/1958   Pearl et al.
2010/0014976 A1  1/2010  Arel et al.

FOREIGN PATENT DOCUMENTS

GB          2 461 784         1/2010

OTHER PUBLICATIONS

International Search Report Issued Feb. 6, 2013 in PCT/FR12/051624 Filed Jul. 10, 2012.

*Primary Examiner* — Thomas Denion
*Assistant Examiner* — Kelsey Stanek
(74) *Attorney, Agent, or Firm* — Oblon, McClelland, Maier & Neustadt, L.L.P.

(57) ABSTRACT

A device for feeding fluid to a hydraulic actuator for controlling a pitch of fan blades of a two-propeller turboprop, the device including: a fluid manifold secured to a rotor of the turboprop and including a cylindrical portion including at least two fluid-circulation grooves, each presenting an outlet orifice; a fluid-admission support secured to a stationary portion of the turboprop and including a cylindrical portion including at least two distinct fluid passages opening to fluid-admission tubes and each leading radially into one of the fluid-circulation grooves of the manifold; and a tub constrained to rotate with the fluid manifold and including a cylindrical portion including at least two fluid-flow channels, each fed with fluid by a respective one of the outlet orifices of the fluid dispenser, each fluid-flow channel leading to a respective chamber of a control actuator.

10 Claims, 3 Drawing Sheets

(51) Int. Cl.
   *B64C 11/30*     (2006.01)
   *B64D 27/00*     (2006.01)
   *F16L 27/093*    (2006.01)
(58) Field of Classification Search
   USPC .................................................. 416/147, 156
   See application file for complete search history.

DEVICE FOR FEEDING FLUID TO A HYDRAULIC ACTUATOR FOR CONTROLLING THE PITCH OF THE FAN BLADES OF A TWO-PROPELLER TURBOPROP

BACKGROUND OF THE INVENTION

The present invention relates to the general field of turboprops provided with two contrarotating propellers driven in rotation by means of a single turbine.

The invention relates more particularly to feeding fluid to a hydraulic actuator for controlling the pitch of the fan blades of a two-propeller turboprop.

In known manner, an airplane turboprop with two propellers has two contrarotating sets of unducted fan blades that are adjustable in pitch. In certain two-propeller turboprop configurations, these sets of fan blades are driven in rotation by a power turbine having two contrarotating rotors. In other configurations more particularly concerned by the present invention, the sets of fan blades are driven by a single rotor of the power turbine via an epicyclic gear train forming a stepdown contrarotating gearbox. By way of example, reference may be made to document FR 2 942 203, which describes an embodiment of such a configuration.

The contrarotating propellers of such a turboprop may be driven in rotation directly or indirectly via the epicyclic gear train. In general, the epicyclic gear train has an inlet that is connected upstream to a rotor shaft of the power turbine in order to be driven thereby, and two outlets, each of which is connected downstream to a respective power shaft for driving rotation of a respective one of the two sets of turboprop fan blades in contrarotating manner.

Furthermore, the angle of orientation of the fan blades in each set (generally referred to as its "pitch") constitutes one of the parameters that enables the thrust from the turboprop and the speed of rotation of the propellers to be controlled. One known technique for controlling the pitch of the fan blades in flight is to make use, for each set of fan blades, of a synchronization ring coupled to each of the blades in the set. A hydraulic actuator positioned at the center of the turboprop and constrained to rotate with the turbine rotor is used for turning the synchronization ring about the longitudinal axis of the turboprop (via a linkage of connecting rods), thereby enabling all of the blades in a given set to be positioned at the same angle. By way of example, reference may be made to patent application FR 11/56443 filed by the Applicant on Jul. 13, 2011 (and not yet published), which describes an embodiment of such a mechanism.

With that type of mechanism, there arises a problem of feeding fluid to the chambers of the actuators. In particular, the admission of fluid takes place via tubes that are fastened to the stationary portions of the turboprop, while the actuators, and thus their chambers, are rotating since they are driven in rotation by the turbine rotor. It is therefore necessary to cause the fluid to pass from a stationary frame of reference to a rotary frame of reference. Furthermore, the transfer of fluid from fluid-admission tubes to the chambers of the control actuators must take place in as small a space as possible in order to avoid increasing the length of the engine.

OBJECT AND SUMMARY OF THE INVENTION

A main object of the present invention is thus to mitigate such drawbacks by proposing a device for feeding fluid to the hydraulic actuators, which device is entirely suitable for incorporating in a turboprop configuration as described above.

In accordance with the invention, this object is achieved by a device for feeding fluid to a hydraulic actuator for controlling the pitch of the fan blades of a two-propeller turboprop, the device comprising:

a fluid manifold constrained to rotate with a rotor of the turboprop and comprising a cylindrical portion that is provided on an outside surface with at least two annular fluid-circulation grooves that are longitudinally spaced apart, each fluid-circulation groove presenting at least one outlet orifice opening out radially to the inside of the cylindrical portion of the fluid manifold;

a fluid-admission support secured to a stationary portion of the turboprop and comprising a cylindrical portion that is arranged around the cylindrical portion of the fluid manifold, being coaxial therewith and provided with at least two distinct fluid passages opening out to respective fluid-admission tubes and each leading radially to the inside of the cylindrical portion of the support in a respective one of the fluid-circulation grooves of the manifold; and a tub constrained to rotate with the fluid manifold and comprising a central portion that is arranged inside the cylindrical portion of the manifold, being coaxial therewith, and provided on an outside surface with at least two longitudinal fluid-flow channels each fed with fluid via a respective one of the outlet orifices of the fluid manifold, each fluid-flow channel having a longitudinal end leading to a chamber of a control actuator.

The device of the invention thus makes it possible to transfer fluid from a stationary frame of reference (i.e. the fluid-admission tubes) to a rotary frame of reference (i.e. the chambers of the actuators for controlling the pitch of the fan blades). Furthermore, the fluid-admission tubes can pass via the exhaust casing of the turboprop that is ventilated so as to constitute a thermal environment that is relatively cool and favorable for the presence of fluid for operating the hydraulic actuators. Also, accommodating such a device in a two-propeller turboprop does not require the length of the engine to be increased and can be arranged in a hydraulic enclosure of the turboprop, with the advantages that that entrains in the event of a leak.

Preferably, the device further comprises a fluid distributor comprising a cylindrical portion interposed radially between the respective cylindrical portions of the fluid manifold and of the fluid-admission support, being coaxial therewith. Under such circumstances, the cylindrical portion of the fluid distributor may include, for each fluid-circulation groove of the manifold, a plurality of orifices that are regularly distributed on an outside surface.

The cylindrical portion of the fluid manifold may be extended at one of its longitudinal ends by a radial portion provided with at least two ducts for passing fluid, each fluid-passing duct opening into a fluid-flow channel of the tub and leading to a control actuator chamber.

Likewise, the cylindrical portion of the fluid-admission support may be extended at one of its longitudinal ends by a radial portion for fastening to a stationary portion of the turboprop.

Ball bearings are advantageously arranged between the fluid manifold and the fluid-admission support.

The fluid-circulation grooves of the fluid manifold may be defined longitudinally relative to one another by at least three annular gaskets arranged on the outside surface of the cylindrical portion of the manifold and projecting radially outwards therefrom.

The invention also provides a two-propeller turboprop having first and second sets of adjustable-pitch fan blades driven in rotation by a rotor of a power turbine, two hydraulic actuators for controlling the pitch of the fan blades and centered on a longitudinal axis of the turboprop, and a device as defined above for feeding fluid to the actuators.

The rotor of the power turbine may drive rotation of the sets of fan blades via a step-down epicyclic gear train.

BRIEF DESCRIPTION OF THE DRAWINGS

Other characteristics and advantages of the present invention appear from the following description made with reference to the accompanying drawings, which show an embodiment having no limiting character. In the figures.

DETAILED DESCRIPTION OF THE INVENTION

Figure 1:
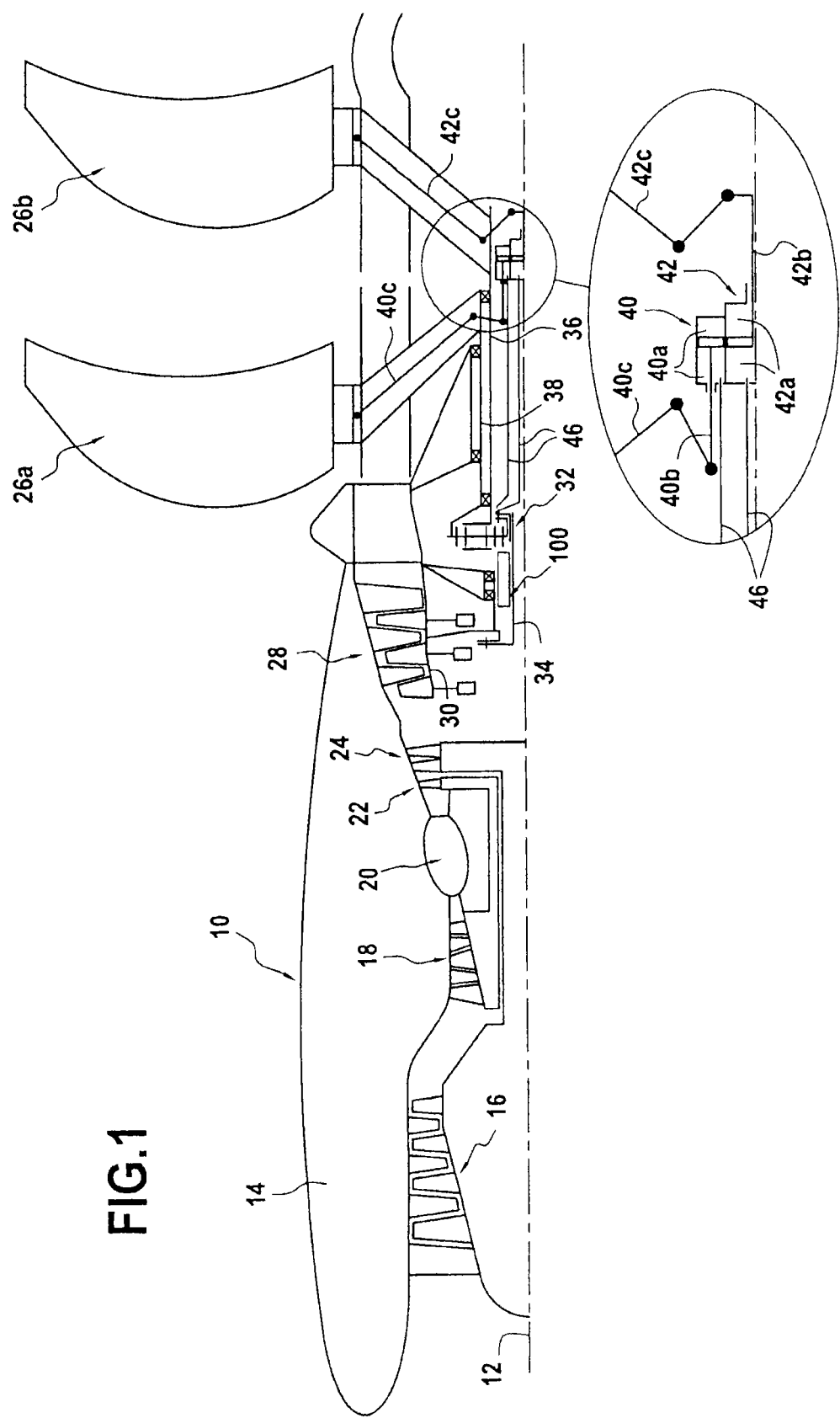
FIG. 1 is a diagrammatic view in longitudinal half-section of a two-propeller turboprop to which the invention applies.

FIG. 1 shows in a highly diagrammatic manner an embodiment of an airplane turboprop of the type having two propellers, to which the invention applies.

Such a turboprop 10 is known and it is therefore not described in detail. It comprises in particular a longitudinal axis 12 and an annular nacelle 14 arranged coaxially around the longitudinal axis. The turboprop 10 also comprises, from upstream to downstream: a low-pressure compressor 16; a high-pressure compressor 18; a combustion chamber 20; a high-pressure turbine 22; and an intermediate-pressure turbine 24.

Downstream from the intermediate-pressure turbine 24 there is a system of contrarotating propellers, namely an upstream (or front) set 26a and a downstream (or rear) set 26b of adjustable pitch fan blades.

This system of contrarotating propellers is driven in rotation by means of a low-pressure turbine 28 arranged downstream from the intermediate-pressure turbine 24. This low-pressure turbine includes in particular a rotor 30 that drives rotation of the two sets 26a, 26b of blades via an epicyclic step-down gear train 32.

The epicyclic gear train is made up of a plurality of planet wheels and planet-carriers (not shown) and it presents an inlet connected upstream to the shaft 34 of the rotor 30 of the low-pressure turbine centered on the longitudinal axis 12 of the turboprop, and two outlets, each connected downstream to a respective drive shaft.

More precisely, one of the outlets of the epicyclic gear train is connected downstream to an inner drive shaft 36 arranged around the longitudinal axis 12 of the turboprop the purpose of driving rotation of the downstream blade set 26b.

The other outlet from the epicyclic gear train is connected downstream to an outer drive shaft 38 arranged coaxially around the inner drive shaft 36, for the purpose of driving rotation of the upstream blade set 26a.

Furthermore, a system is provided for controlling the pitch of the fan blades in each of the upstream and downstream sets. In known manner, the systems enable the angle of orientation of the fan blades to be adjusted in flight in order to control the thrust of the turboprop and to modify the speed of rotation of the propellers.

In the embodiment of FIG. 1, each of the systems comprises in particular a hydraulic actuator, respectively an actuator 40 for controlling the pitch of the blades of the upstream set and an actuator 42 for controlling the pitch of the blades of the downstream set, which actuators are centered on the longitudinal axis 12 of the turboprop and constrained to rotate with a rotor shaft driving rotation of the downstream set.

Each of these actuators 40, 42 comprises two chambers respectively 40a and 42a that are disposed coaxially around the longitudinal axis 12 of the turboprop and that are fed with hydraulic fluid (oil) from a device of the invention as described below.

On being moved, respective rigid rods 40b, 42b connected to the pistons of the actuators 40, 42 serve to adjust the pitch of the blades in the upstream and downstream sets by means of control links 40c, 42c and synchronization rings (not shown in the figures). An example of such a system is described in patent application FR 11/56443 filed by the Applicant on July 13 (and not yet published) with the title "A device for controlling the pitch of turboprop fan blades", to which reference may be made.

Figure 2:
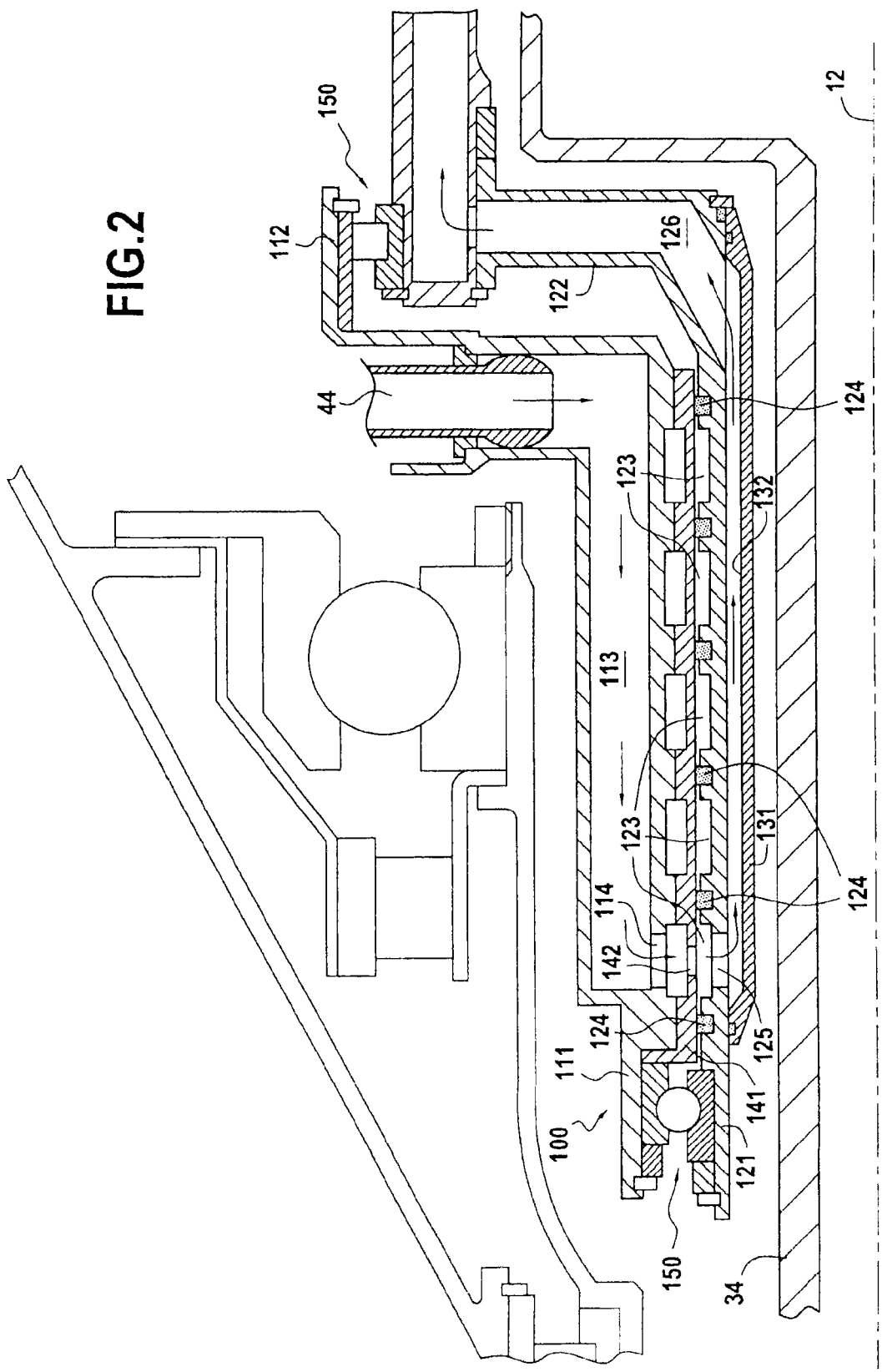
FIG. 2 is an enlargement of FIG. 1 showing a fluid of the device in accordance with the invention.
Figure 3:
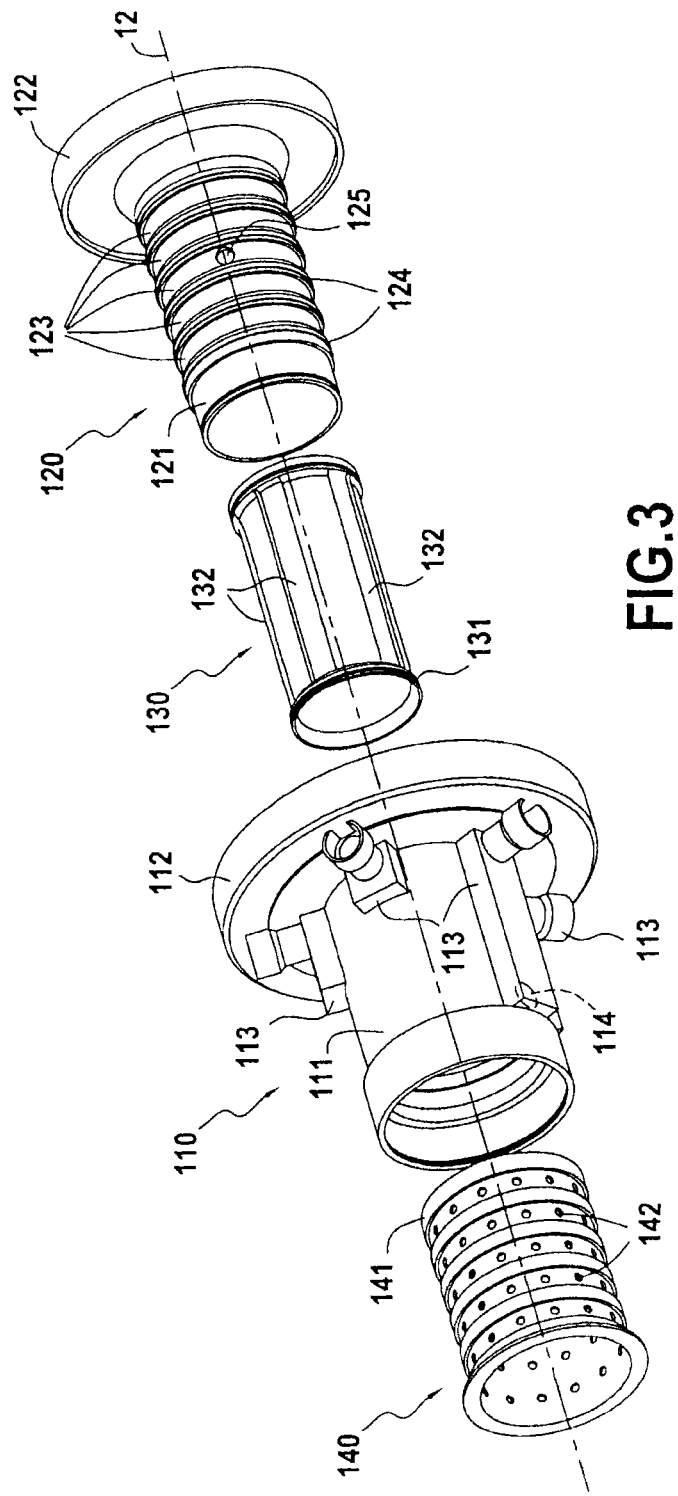
FIG. 3 is an exploded perspective view of the FIG. 2 fluid of the device.

The two chambers of the actuators 40, 42 are fed with hydraulic fluid with the help of a feed device 100 in accordance with the invention and shown in FIGS. 2 and 3.

The feed device 100 comprises in particular (going from the outside towards the inside): a fluid-admission support 110; a fluid manifold 120; and a tub 130. These elements are annular in shape and they are arranged around the shaft 34 of the rotor of the low-pressure turbine (being coaxial thereabout) and upstream from the epicyclic gear train.

More precisely, the fluid-admission support 110 comprises a cylindrical portion 111 centered on the longitudinal axis 12 of the turboprop and extended at its downstream end by a radial attachment portion 112 that is for fastening to a stationary portion of the turboprop.

On its outside surface, the cylindrical portion 111 is provided with five distinct fluid passages 113, each opening radially towards a static fluid-admission tube 44. These fluid passages 113 are regularly spaced around the longitudinal axis 12 of the turboprop and they extend longitudinally from the radial portion 112 of the fluid-admission support. They lead to outlet orifices 114 on the inside of the support, which orifices are longitudinally spaced apart from one another.

The fluid manifold 120 likewise has a cylindrical portion 121 centered on the longitudinal axis 12 of the turboprop and extended at its downstream end by a radial attachment portion 122 constrained to rotate with the shaft 34 of a rotor of the turboprop, e.g. the shaft of the low-pressure turbine.

The cylindrical portion 121 of the fluid manifold is arranged more precisely inside the cylindrical portion of the fluid-admission support, and is coaxial therewith. On its outside surface, it is provided with five fluid-circulation grooves 123 of annular shape that are centered on the longitudinal axis 12 of the turboprop, being spaced apart longitudinally from one another and being mutually defined by six annular gaskets 124 that project radially outwards. Each of these fluid-circulation grooves presents at least one outlet orifice 125 opening out radially to the inside of the cylindrical portion of the manifold.

The attachment portion 122 of the fluid manifold is provided with five ducts 126 for passing fluid, four of these ducts leading downstream towards the four chambers of the actuators 40 and 42 in order to feed them with hydraulic fluid, the last duct leading to a safety control of the fan blade pitch control system for preventing these blades being put into thrust while in flight (not shown in the figures).

The respective cylindrical portions of the fluid manifold and of the fluid-admission support are arranged relative to one another in such a manner that: the gaskets 124 of the manifold make fluidtight contact with the inside surface of the cylindrical portion 111 of the support so as to make the fluid-circulation grooves 123 of the manifold independent from one another; and each of the outlet orifices 114 of the support leads to a respective one of the fluid-circulation grooves 123 in order to feed them with fluid.

The tub 130 of the feeder device of the invention is constrained to rotate with the fluid manifold to which it is fastened. It has a cylindrical portion 131 that is arranged inside the cylindrical portion of the manifold 121, being coaxial therewith. On its outside surface, this cylindrical portion 131 has five fluid-flow channels 132 extending longitudinally between its two ends.

The respective cylindrical portions of the fluid manifold and of the tub are arranged angularly relative to one another in such a manner that: each of the fluid-flow channels 132 is fed with fluid by one of the outlet orifices 125 of the fluid manifold; and each fluid-passing duct 126 of the manifold opens to the downstream end of a fluid-flow channel 132 of the tub.

The operation of the device of the invention stems clearly from the above description. The fluid-admission tubes 44, which are secured to the casing of the turboprop, inject a hydraulic fluid into each of the five fluid passages 113 of the support (which is likewise stationary). The fluid escapes from these fluid passages so as to feed each of the fluid-circulation grooves 123 of the manifold, which manifold is driven in rotation about the longitudinal axis of the turboprop by the shaft 34 of the rotor of the low-pressure turbine. This achieves the transfer of fluid from a static frame of reference to a dynamic frame of reference. Thereafter, the fluid flows inside the manifold in order to feed each of the fluid-flow channels 132 of the tub. At the downstream end thereof, the fluid then follows a fluid-passing duct 126 of the manifold. These ducts pass through the planet carriers of the epicyclic gear train (which have holes pierced in them for this purpose) and they are connected downstream therefrom to the tubes 46 connected further downstream to the chambers of the actuators of the systems for controlling the pitch of the fan blades (only two tubes 46 are shown diagrammatically in FIG. 1).

In the presently described example and as shown in figures, hydraulic fluid is fed to five different hydraulic members (namely the chambers of two actuators and the safety control). Naturally, the invention applies more generally to feeding n hydraulic members (n≥2), in which case there should be provided n fluid passages 113, n fluid-circulation grooves 123, n ducts 126, n fluid-admission tubes 44, and n+1 annular gaskets 124.

According to an advantageous characteristic of the invention, a fluid distributor 140 is interposed radially between the fluid-admission support 110 and the fluid manifold 120.

More precisely, the fluid distributor comprises a cylindrical portion 141 that is mounted between the respective cylindrical portions 111, 121 of the manifold and of the support, while being coaxial therewith. For each fluid-circulation groove 123 of the manifold, this cylindrical portion 141 has a plurality of through orifices 142 leading to the inside of the distributor. These through orifices are regularly spaced around the longitudinal axis 12 of the manifold so as to ensure uniform quantities of fluid penetrate into the fluid-circulation grooves 123.

In another advantageous provision of the invention, as shown in FIG. 2, ball bearings 150 are arranged between the fluid manifold 120 and the fluid-admission support 110 (at their upstream and downstream ends). These ball bearings enable the fluid manifold to be rotatably supported relative to the fluid-admission support.

The invention claimed is:

1. A device for feeding fluid to a hydraulic actuator for controlling a pitch of fan blades of a two-propeller turboprop, the device comprising:
    a fluid manifold constrained to rotate with a rotor of the turboprop and including a cylindrical portion provided on an outside surface including at least two annular fluid-circulation grooves that are longitudinally spaced apart, each fluid-circulation groove presenting at least one outlet orifice opening out radially to an inside of the cylindrical portion of the fluid manifold;
    a fluid-admission support secured to a stationary portion of the turboprop and including a cylindrical portion arranged around the cylindrical portion of the fluid manifold, being coaxial therewith and including at least two distinct fluid passages opening out to respective fluid-admission tubes and each leading radially to an inside of the cylindrical portion of the support in a respective one of the fluid-circulation grooves of the manifold; and
    a tub constrained to rotate with the fluid manifold and including a central portion arranged inside the cylindrical portion of the manifold, being coaxial therewith, and provided on an outside surface and including at least two longitudinal fluid-flow channels each fed with fluid via a respective one of the outlet orifices of the fluid manifold, each fluid-flow channel having a longitudinal end leading to a chamber of a control actuator.

2. A device according to claim 1, further comprising a fluid distributor including a cylindrical portion interposed radially between the respective cylindrical portions of the fluid manifold and of the fluid-admission support, being coaxial therewith.

3. A device according to claim 2, wherein the cylindrical portion of the fluid distributor includes, for each fluid-circulation groove of the manifold, a plurality of orifices that are regularly distributed on an outside surface.

4. A device according to claim 1, wherein the cylindrical portion of the fluid manifold is extended at one of its longitudinal ends by a radial portion including at least two ducts for passing fluid, each fluid-passing duct opening into a fluid-flow channel of the tub and leading to a control actuator chamber.

5. A device according to claim 1, wherein the cylindrical portion of the fluid-admission support is extended at one of its longitudinal ends by a radial portion for fastening to a stationary portion of the turboprop.

6. A device according to claim 1, further comprising ball bearings arranged between the fluid manifold and the fluid-admission support.

7. A device according to claim 1, wherein the fluid passages of the fluid-admission support are regularly spaced apart from one another.

8. A device according to claim 1, wherein the fluid-circulation grooves of the fluid manifold are defined longitudinally relative to one another by at least three annular gaskets arranged on the outside surface of the cylindrical portion of the manifold and projecting radially outwards therefrom.

9. A two-propeller turboprop comprising:
first and second sets of adjustable-pitch fan blades driven in rotation by a rotor of a power turbine;
two hydraulic actuators for controlling the pitch of the fan blades and centered on a longitudinal axis of the turboprop; and
a device according to claim 1 for feeding fluid to the actuators.

10. A turboprop according to claim 9, wherein the rotor of the power turbine drives rotation of the sets of fan blades via a step-down epicyclic gear train.

\* \* \* \* \*